(12) United States Patent
Fujita et al.

(10) Patent No.: US 6,654,051 B1
(45) Date of Patent: Nov. 25, 2003

(54) DIGITAL CAMERA

(75) Inventors: Takashi Fujita, Osaka (JP); Kenichi Kikuchi, Daito (JP); Hideto Hayashi, Daito (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/166,911

(22) Filed: Oct. 6, 1998

(30) Foreign Application Priority Data

Oct. 7, 1997  (JP) .............................................. 9-274807

(51) Int. Cl.[7] .............................. H04N 5/76; G06F 12/00
(52) U.S. Cl. ................. 348/231.1; 348/231.3; 348/207.1; 711/1
(58) Field of Search ................................ 348/231, 233, 348/207, 232, 231.1, 231.3, 207.1, 231.2; 711/1

(56) References Cited

U.S. PATENT DOCUMENTS

| | | | | |
|---|---|---|---|---|
| 5,138,459 A | * | 8/1992 | Roberts et al. .............. | 348/233 |
| 5,239,382 A | | 8/1993 | Hatakenaka et al. | |
| 5,349,448 A | * | 9/1994 | Hirai ........................... | 358/444 |
| 5,454,096 A | * | 9/1995 | Otsuka et al. .................. | 711/1 |
| 5,717,496 A | | 2/1998 | Satoh et al. | |
| 6,084,630 A | * | 7/2000 | Yamagishi et al. .......... | 348/207 |
| 6,094,219 A | * | 7/2000 | Roberts et al. .............. | 348/207 |
| 6,125,435 A | * | 9/2000 | Estakhri et al. .............. | 711/201 |
| 6,249,313 B1 | * | 6/2001 | Nishi .......................... | 348/233 |
| 6,275,942 B1 | * | 8/2001 | Bernhard et al. ........... | 713/201 |
| 6,347,184 B2 | * | 2/2002 | Yamagishi ................... | 348/232 |

FOREIGN PATENT DOCUMENTS

| | | |
|---|---|---|
| JP | 6-125525 | 5/1994 |
| JP | 6-225252 | 8/1994 |

OTHER PUBLICATIONS

Patent Abstracts of Japan, vol. 018, No. 218, Apr. 19, 1994 & JP 06 014229 A (Nikon Corp), Jan. 21, 1994 *Abstract*.

* cited by examiner

Primary Examiner—Wendy R. Garber
Assistant Examiner—Lin Ye
(74) Attorney, Agent, or Firm—Armstrong, Westerman & Hattori, LLP (57) ABSTRACT

A digital camera includes a CPU. When a memory card is attached to the digital camera, the CPU determines as to a format formed on the memory card. If the format is a normal format, the CPU changes the normal format to an optimal format. However, where an image file is already stored in the memory card or a directory for a file other than the image file is formed, the CPU does not change the format.

10 Claims, 7 Drawing Sheets

4 MB DOSFORMAT

| LOGIC SECTOR | NORMAL FORMAT 2KB / CLUSTER | OPTIMAL FORMAT 8KB / CLUSTER |
|---|---|---|
| 0 | MASTER BOOT | MASTER BOOT |
| 1 | VACANT | VACANT |
| 2 | VACANT | VACANT |
| 3 | VACANT | VACANT |
| 4 | VACANT | VACANT |
| 5 | VACANT | VACANT |
| 6 | VACANT | VACANT |
| 7 | VACANT | VACANT |
| 8 | BOOT | VACANT |
| 9 | FAT1 | VACANT |
| 10 | FAT1 | VACANT |
| 11 | FAT1 | VACANT |
| 12 | FAT1 | VACANT |
| 13 | FAT1 | VACANT |
| 14 | FAT1 | VACANT |
| 15 | FAT2 | VACANT |
| 16 | FAT2 | VACANT |
| 17 | FAT2 | VACANT |
| 18 | FAT2 | VACANT |
| 19 | FAT2 | VACANT |
| 20 | FAT2 | VACANT |
| 21 | DIRECTORY | VACANT |
| 22 | DIRECTORY | VACANT |
| 23 | DIRECTORY | VACANT |
| 24 | DIRECTORY | VACANT |
| 25 | DIRECTORY | VACANT |
| 26 | DIRECTORY | VACANT |
| 27 | DIRECTORY | BOOT |
| 28 | DIRECTORY | FAT1 |
| 29 | DIRECTORY | FAT1 |
| 30 | DIRECTORY | FAT2 |
| 31 | DIRECTORY | FAT2 |
| 32 | DIRECTORY | DIRECTORY |
| 33 | DIRECTORY | DIRECTORY |
| 34 | DIRECTORY | DIRECTORY |
| 35 | DIRECTORY | DIRECTORY |
| 36 | DIRECTORY | DIRECTORY |
| 37 | | DIRECTORY |
| 38 | 1 CLUSTER | DIRECTORY |
| 39 | | DIRECTORY |
| 40 | | DIRECTORY |
| 41 | | DIRECTORY |
| 42 | 1 CLUSTER | DIRECTORY |
| 43 | | DIRECTORY |
| 44 | | DIRECTORY |
| 45 | | DIRECTORY |
| 46 | 1 CLUSTER | DIRECTORY |
| 47 | | DIRECTORY |
| 48 | | |
| 49 | | |
| 50 | 1 CLUSTER | |
| 51 | | |
| 52 | | 1 CLUSTER |
| 53 | | |
| 54 | 1 CLUSTER | |
| 55 | | |
| 56 | | |
| 57 | | |
| 58 | 1 CLUSTER | |
| 59 | | |
| 60 | | |
| 61 | | |
| 62 | 1 CLUSTER | |
| 63 | | |

FIG. 3

4 MBYTE SMART MEDIUM NORMAL FORMAT
Partition Boot Sector

```
000   E9 00 00 20 20 20 20 20 20 20 20 00 02 04 01 00  : ................
010   02 00 01 38 1F F8 06 00 08 00 04 00 08 00 00 00  : ...8............
020   00 00 00 00 00 00 00 00 00 00 00 00 00 00 00 00  : ................
030   00 00 00 00 00 00 46 41 54 31 32 20 20 20 00 00  : ......FAT12   ..
040   00 00 00 00 00 00 00 00 00 00 00 00 00 00 00 00  : ................
050   00 00 00 00 00 00 00 00 00 00 00 00 00 00 00 00  : ................
060   00 00 00 00 00 00 00 00 00 00 00 00 00 00 00 00  : ................
070   00 00 00 00 00 00 00 00 00 00 00 00 00 00 00 00  : ................
080   00 00 00 00 00 00 00 00 00 00 00 00 00 00 00 00  : ................
090   00 00 00 00 00 00 00 00 00 00 00 00 00 00 00 00  : ................
0A0   00 00 00 00 00 00 00 00 00 00 00 00 00 00 00 00  : ................
0B0   00 00 00 00 00 00 00 00 00 00 00 00 00 00 00 00  : ................
0C0   00 00 00 00 00 00 00 00 00 00 00 00 00 00 00 00  : ................
0D0   00 00 00 00 00 00 00 00 00 00 00 00 00 00 00 00  : ................
0E0   00 00 00 00 00 00 00 00 00 00 00 00 00 00 00 00  : ................
0F0   00 00 00 00 00 00 00 00 00 00 00 00 00 00 00 00  : ................
100   00 00 00 00 00 00 00 00 00 00 00 00 00 00 00 00  : ................
110   00 00 00 00 00 00 00 00 00 00 00 00 00 00 00 00  : ................
120   00 00 00 00 00 00 00 00 00 00 00 00 00 00 00 00  : ................
130   00 00 00 00 00 00 00 00 00 00 00 00 00 00 00 00  : ................
140   00 00 00 00 00 00 00 00 00 00 00 00 00 00 00 00  : ................
150   00 00 00 00 00 00 00 00 00 00 00 00 00 00 00 00  : ................
160   00 00 00 00 00 00 00 00 00 00 00 00 00 00 00 00  : ................
170   00 00 00 00 00 00 00 00 00 00 00 00 00 00 00 00  : ................
180   00 00 00 00 00 00 00 00 00 00 00 00 00 00 00 00  : ................
190   00 00 00 00 00 00 00 00 00 00 00 00 00 00 00 00  : ................
1A0   00 00 00 00 00 00 00 00 00 00 00 00 00 00 00 00  : ................
1B0   00 00 00 00 00 00 00 00 00 00 00 00 00 00 00 00  : ................
1C0   00 00 00 00 00 00 00 00 00 00 00 00 00 00 00 00  : ................
1D0   00 00 00 00 00 00 00 00 00 00 00 00 00 00 00 00  : ................
1E0   00 00 00 00 00 00 00 00 00 00 00 00 00 00 00 00  : ................
1F0   00 00 00 00 00 00 00 00 00 00 00 00 00 00 55 AA  : ..............U.
```

FIG. 4

4 MBYTE SMART MEDIUM OPTIMAL FORMAT
Partition Boot Sector

```
000  E9 00 00 20 20 20 20 20 20 20 20 00 02 (10) 01 00  : ...            
010  02 00 01 25 1F F8 02 00 08 00 04 00 1B 00 00 00  : ...%............
020  00 00 00 00 00 00 00 00 00 00 00 00 00 00 00 00  : ................
030  00 00 00 00 00 00 46 41 54 31 32 20 20 20 00 00  : ......FAT12   ..
040  00 00 00 00 00 00 00 00 00 00 00 00 00 00 00 00  : ................
050  00 00 00 00 00 00 00 00 00 00 00 00 00 00 00 00  : ................
060  00 00 00 00 00 00 00 00 00 00 00 00 00 00 00 00  : ................
070  00 00 00 00 00 00 00 00 00 00 00 00 00 00 00 00  : ................
080  00 00 00 00 00 00 00 00 00 00 00 00 00 00 00 00  : ................
090  00 00 00 00 00 00 00 00 00 00 00 00 00 00 00 00  : ................
0A0  00 00 00 00 00 00 00 00 00 00 00 00 00 00 00 00  : ................
0B0  00 00 00 00 00 00 00 00 00 00 00 00 00 00 00 00  : ................
0C0  00 00 00 00 00 00 00 00 00 00 00 00 00 00 00 00  : ................
0D0  00 00 00 00 00 00 00 00 00 00 00 00 00 00 00 00  : ................
0E0  00 00 00 00 00 00 00 00 00 00 00 00 00 00 00 00  : ................
0F0  00 00 00 00 00 00 00 00 00 00 00 00 00 00 00 00  : ................
100  00 00 00 00 00 00 00 00 00 00 00 00 00 00 00 00  : ................
110  00 00 00 00 00 00 00 00 00 00 00 00 00 00 00 00  : ................
120  00 00 00 00 00 00 00 00 00 00 00 00 00 00 00 00  : ................
130  00 00 00 00 00 00 00 00 00 00 00 00 00 00 00 00  : ................
140  00 00 00 00 00 00 00 00 00 00 00 00 00 00 00 00  : ................
150  00 00 00 00 00 00 00 00 00 00 00 00 00 00 00 00  : ................
160  00 00 00 00 00 00 00 00 00 00 00 00 00 00 00 00  : ................
170  00 00 00 00 00 00 00 00 00 00 00 00 00 00 00 00  : ................
180  00 00 00 00 00 00 00 00 00 00 00 00 00 00 00 00  : ................
190  00 00 00 00 00 00 00 00 00 00 00 00 00 00 00 00  : ................
1A0  00 00 00 00 00 00 00 00 00 00 00 00 00 00 00 00  : ................
1B0  00 00 00 00 00 00 00 00 00 00 00 00 00 00 00 00  : ................
1C0  00 00 00 00 00 00 00 00 00 00 00 00 00 00 00 00  : ................
1D0  00 00 00 00 00 00 00 00 00 00 00 00 00 00 00 00  : ................
1E0  00 00 00 00 00 00 00 00 00 00 00 00 00 00 00 00  : ................
1F0  00 00 00 00 00 00 00 00 00 00 00 00 00 00 55 AA  : ..............U.
```

DIGITAL CAMERA

BACKGROUND OF THE INVENTION

1. Field of the Invention

This invention relates to digital cameras and, more particularly, to a digital camera which is arranged to store image data, for example, in a memory medium arranged detachably attached thereto.

2. Description of the Related Art

There are smart media (SSFDC) marketed widespread by Toshiba Corporation which are used as a memory medium for a digital camera of this kind. Such a smart medium is initially formatted in a normal DOS format (normal format). With this format, where a smart medium has a capacity, for example, of 4 MB, it contains sectors in number of "4" for each cluster, as shown in FIG. 2.

The cluster here refers to a minimal unit within which data continuity is to be guaranteed. That is, even if a plurality of clusters for one image file is to be stored in a sporadic fashion by repeated recordation and erasure of the image file, the image data thereof will be kept continuous in each cluster.

However, because the data amount of a photographic image is approximately 60 KB, there is a necessity for a normal format to have clusters of as many as 30 or so for one image file. Accordingly, where clusters exist in a scattered manner, it takes considerable time to get access to these image files.

Figure 2:
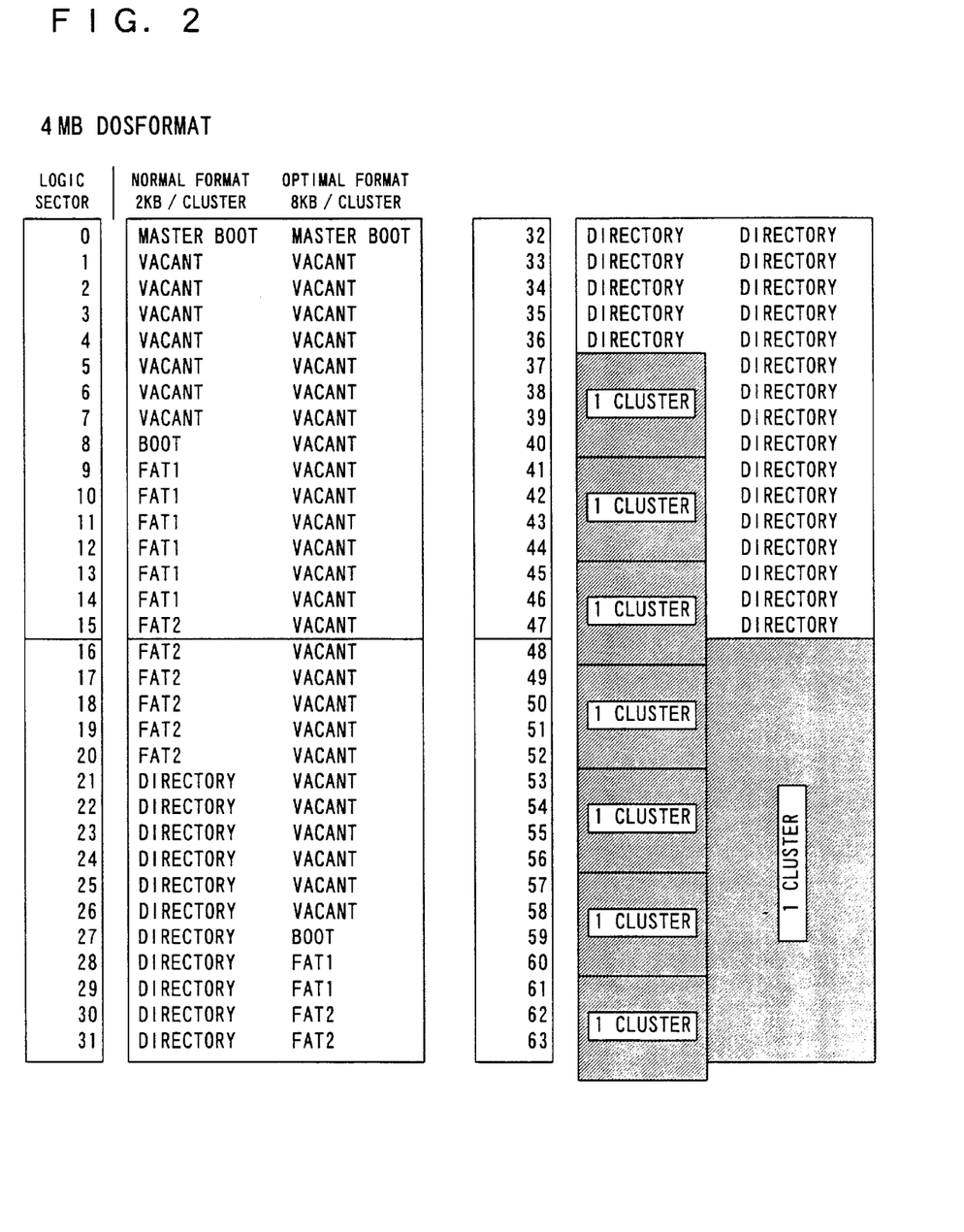
FIG. 2 is an illustrative view showing a format given on a memory card.

In order to avoid this, a DOS format (optimal format) is optimally defined for image files as shown in FIG. 2, to reduce the time of accessing to the image files. With this optimal format, the number of sectors for one cluster is reduced to "16" in order to facilitate the access to the image file clusters, thereby reducing access time.

The conventional digital camera of this kind has a function to establish an optimal mode so that an operator can manipulate buttons to change the normal format initially given for a smart medium to an optimal format.

However, the operator usually is unaware of a format formed on a purchased smart medium, and in many cases uses the camera with the normal format kept unchanged. in this manner, the operator has to manipulate buttons and set an optimal format if he wishes to comfortably operate the camera.

SUMMARY OF THE INVENTION

Therefore, it is a primary object of the present invention to provide a novel digital camera.

It is another object of the present invention to provide a digital camera which can be appropriately operated without giving especial attention to the format given on a memory medium.

According to the present invention, a digital camera having a memory medium detachably attached to store an image file, comprises: a determining means which determines as to a format formed on the memory medium; and a format forming means which forms a particular format on the memory medium depending upon an output of the determining means.

The memory medium storing the image file is determined as to a format by the determining means. The format forming means forms a particular format depending upon an output of the determining means.

In one aspect of the present invention, the particular format is a format optimal for storing the image file. When a normal format is formed on the memory medium, the format forming means changes the normal format to the optimal format. However, when the memory medium formed with the normal format is in a predetermined state, a disabling means disables the format forming means.

In one embodiment of the present invention, the predetermined state is a state that is formed with a directory for a file other than the image file in the memory medium, or a state that is formed with a directory for the image file and the image file is held in the directory.

In another embodiment of the present invention, the determining means determines a current format as the normal format when memory medium has a first predetermined sector falling under a first predetermined area. Incidentally, the first predetermined sector is an 8-th sector and the first predetermined area is a boot area.

In still another embodiment of the present invention, the determining means determines a current format as the optimal format when the memory medium has a second predetermined sector falling under a second predetermined area and the second predetermined area has predetermined data existing therein. Incidentally, the second predetermined sector is a 27-th sector and the second predetermined area is a boot area, the predetermined data is data representative of a predetermined number of sectors included in one cluster.

In yet another embodiment of the present invention, a first enabling means enables the determining means when the memory medium is attached.

In another aspect of the present invention, an instructing means which instructs to delete the image file stored in the memory medium, a deleting means which deletes the image file depending upon an output of the instructing means, and second enabling means which enables the determining means when all of the image file is all deleted.

In one embodiment of the present invention, the instructing means includes an entire deletion instructing means which instructs deletion of all of the image file.

According to the present invention, the operator can comfortably operate the camera without paying attention to a memory medium state because a particular format is formed on the memory medium depending upon an output of the determining means.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 3 is an illustrative view showing a boot region in the memory card normally formatted;

FIG. 4 is an illustrative view showing a boot region in the memory card optimally formatted;

DETAILED DESCRIPTION OF THE PREFERRED EMBODIMENTS

Figure 1:
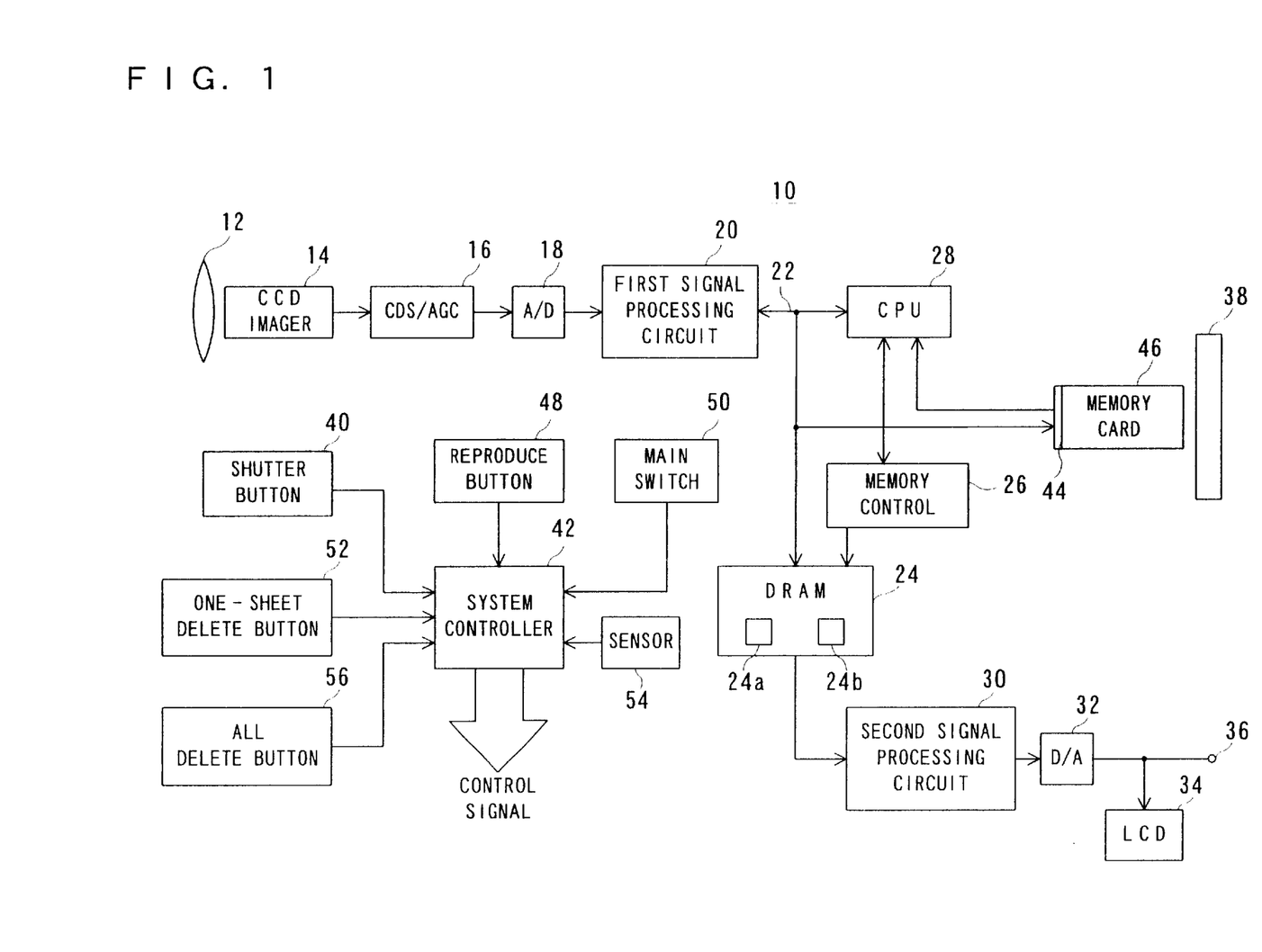
FIG. 1 is a block diagram showing one embodiment of the present invention.

Referring to FIG. 1, a digital camera 10 is a preferred exemplary embodiment includes a lens 12. An Optical image taken through this lens 12 is given to a CCD image 14 via a color filter having Cy, Ye, Mg and G arranged in a mosaic form.

In a camera mode, the CCD imager 14 performs so-called pixel-mixing readout. This provides a pixel signal which is supplied to a CDS/AGC circuit 16. The CDS/AGC circuit 16 performs well-known noise removal and level adjustment on the inputted pixel signal. The pixel signal thus processed is then converted by an A/D converter 18 into digital data, or pixel data. A first signal processing circuit 20 performs color separation and YUV conversion on the pixel data outputted from the AID converter 18.

The YUV data thus created is written by a memory control circuit 26 into a memory area 24a of a DRAM 24 through a bus 22, which is to be thereafter outputted to a second signal processing circuit 30. The second signal processing circuit 30, during outputting motion images, performs predetermined horizontal and vertical interpolations on the YUV data (motion image data) from the DRAM 24 so that the data becomes adapted to a display screen size on the LCD 34. The motion image data on the second signal processing circuit 30 is converted by a D/A converter 32 into an analog signal so that this signal is supplied to the LCD 34 and outputted through an output terminal 36. In this manner, motion pictures are outputted through the LCD 34.

If a shutter button 40 is depressed, a system controller 42 controls the CCD imager 14 to perform so-called all-pixel readout. This causes the CCD imager 14 to output pixel signals by an interline scheme. That is, the CCD imager 14 outputs an odd line of a pixel signal during a first 1-field period, and an even line of pixel signal during a next 1-field period. The CDS/AGC circuit 16 subjects the pixel signal to noise removal and level adjustment, similarly to the above. The A/D converter 18, in turn, converts the pixel signal of the CDS/AGC circuit 16 into digital data, i.e., pixel data. The CCD imager 14 is disabled after outputting 1 frame of pixel signals. The 1-frame image data created by the A/D converter 18 is delivered directly onto the bus 22 without processed by the first signal processing circuit 20. This 1-frame image data is written by a memory control circuit 26 into the memory area 24a.

A CPU 28 performs YUV conversion on the pixel data in the memory area 24a with using a work area 24b, and compresses the converted YUV data, i.e., photographic image data, according to a JPEG format to accommodate the compressed data within an image file. The image file is recorded in a memory card 46. Incidently, the memory card 46 is a smart medium (SSFDC) made by Toshiba Corporation, as stated before.

The memory control circuit 26 reads, line by line, pixel data of Ye, Cy, Mg and G out of the memory area 24a, and supplies them to the second signal processing circuit 30. When the shutter button 40 is depressed, the second signal processing circuit 30 subjects the pixel data to color separation and YUV conversion, whereby the photographic image (freeze image) is outputted through the LCD 34.

In a reproduce mode established, if a reproduce button 48 is depressed, the CPU 28 reads out compressed data contained in a desired image file and decompresses the compressed data with using the work area 24b. The photographic image data (YUV data) thus decompressed is stored into the memory area 24a so that it can be thereafter read therefrom. The second signal processing circuit 30 performs horizontal and vertical interpolations on this YUV data so that a reproduced image is displayed on the LCD 34.

The system controller 42, even when its main power is turned off, is backed up by an auxiliary power supply so that it can monitor an output of a sensor 54 at all times. The sensor 54 serves to detect a state of an opening/closing lid 38 formed at an accommodation section for accommodating a memory card 46. When the opening/closing lid 38 is closed, the sensor 54 supplies a high level signal to the system controller 42. The system controller 42 responds to the output of the sensor 54 and turns on/off the main power. That is, the main power is turned off when the opening/closing lid 38 is opened, and turned on when the opening/closing lid 38 is closed.

Incidentally, the system controller 42 turns off the main power also when a main switch 50 is switched to an off side. Also, the system controller 42 establishes a camera mode when the main switch 50 is switched to an REC side, and a reproduce mode when it is switched to a PLAY side.

Figure 5:
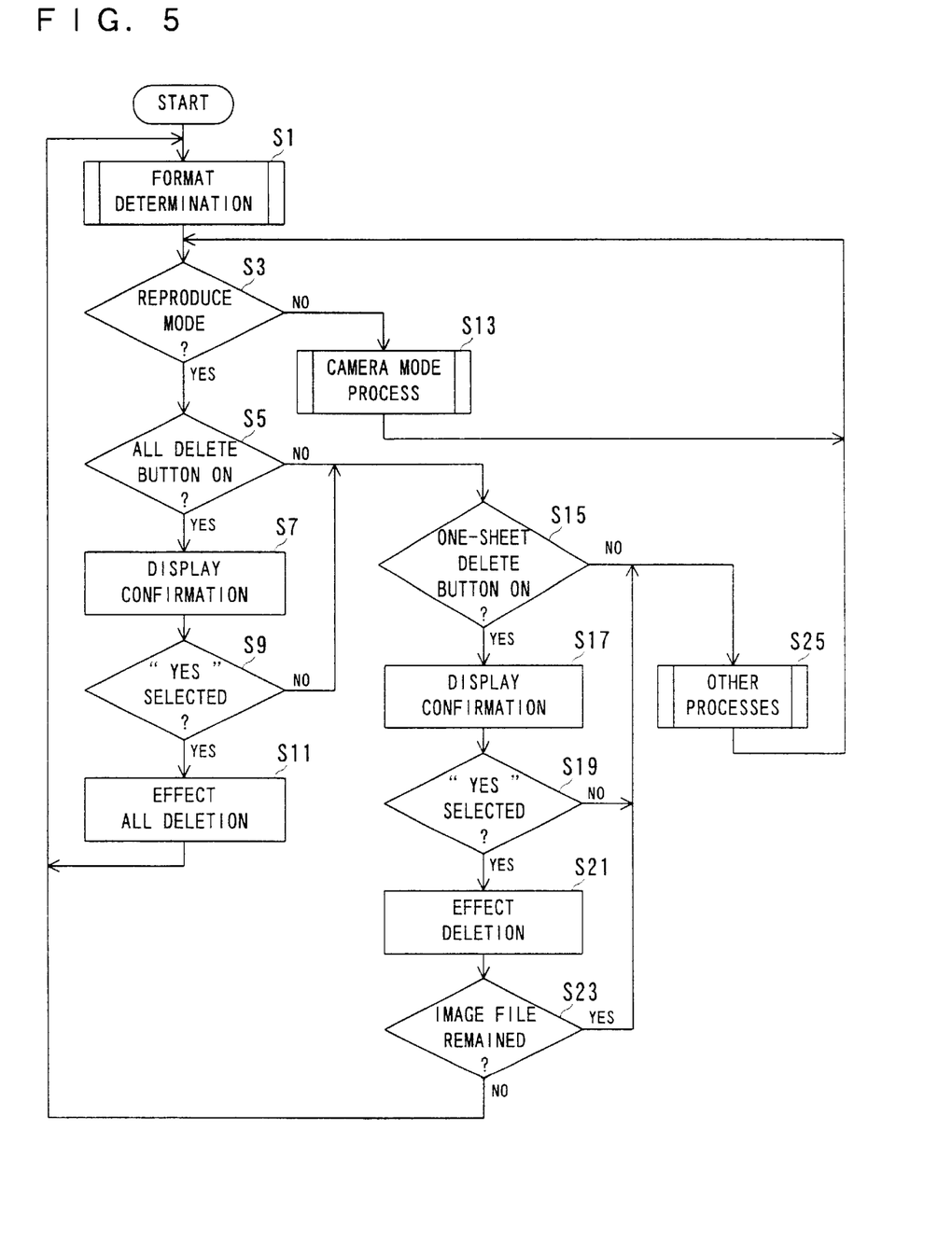
FIG. 5 is a flowchart showing part of operation in the FIG. 1 embodiment.
Figure 6:
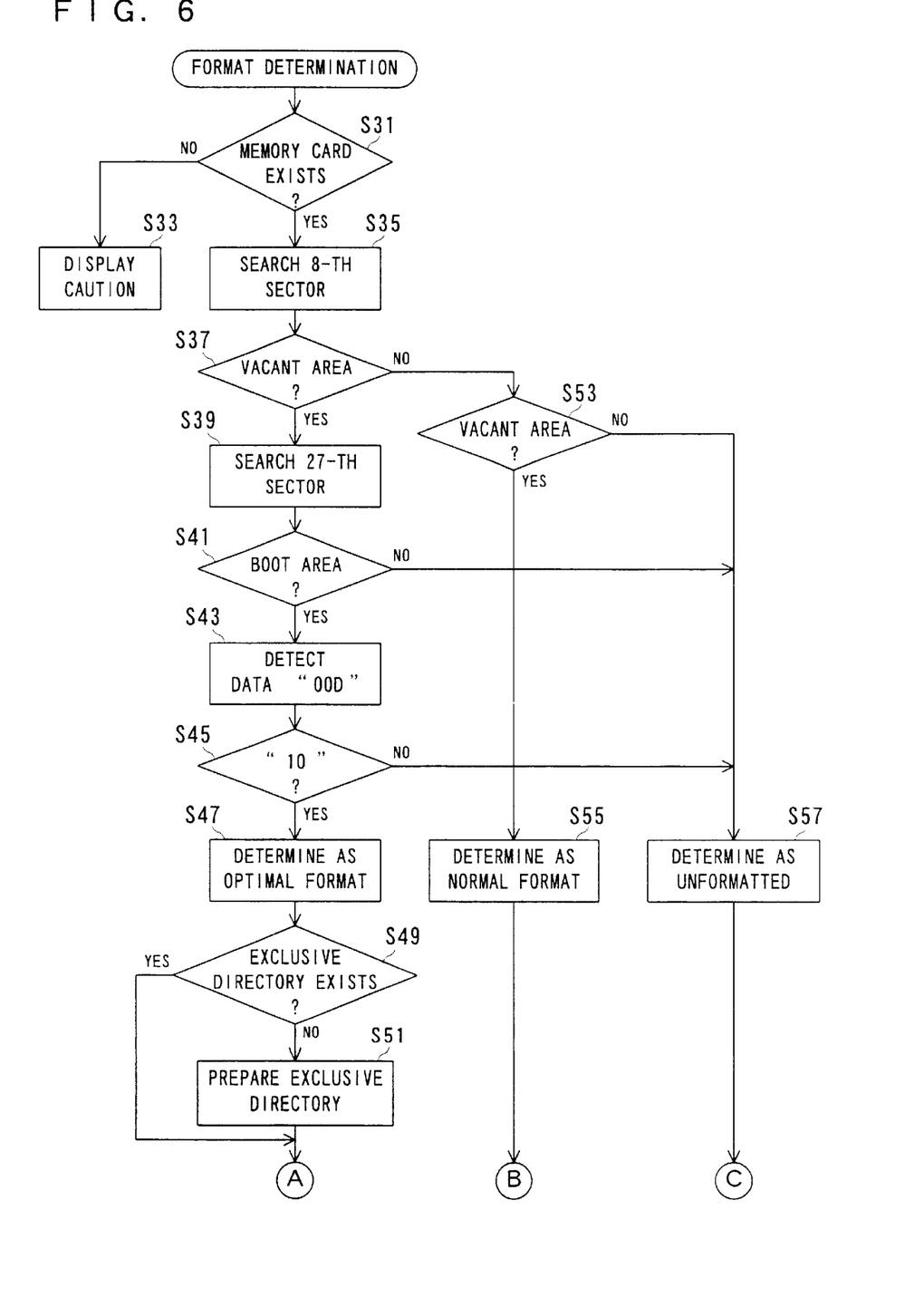
FIG. 6 is a flowchart showing another part of the operation in the FIG. 1 embodiment.
Figure 7:
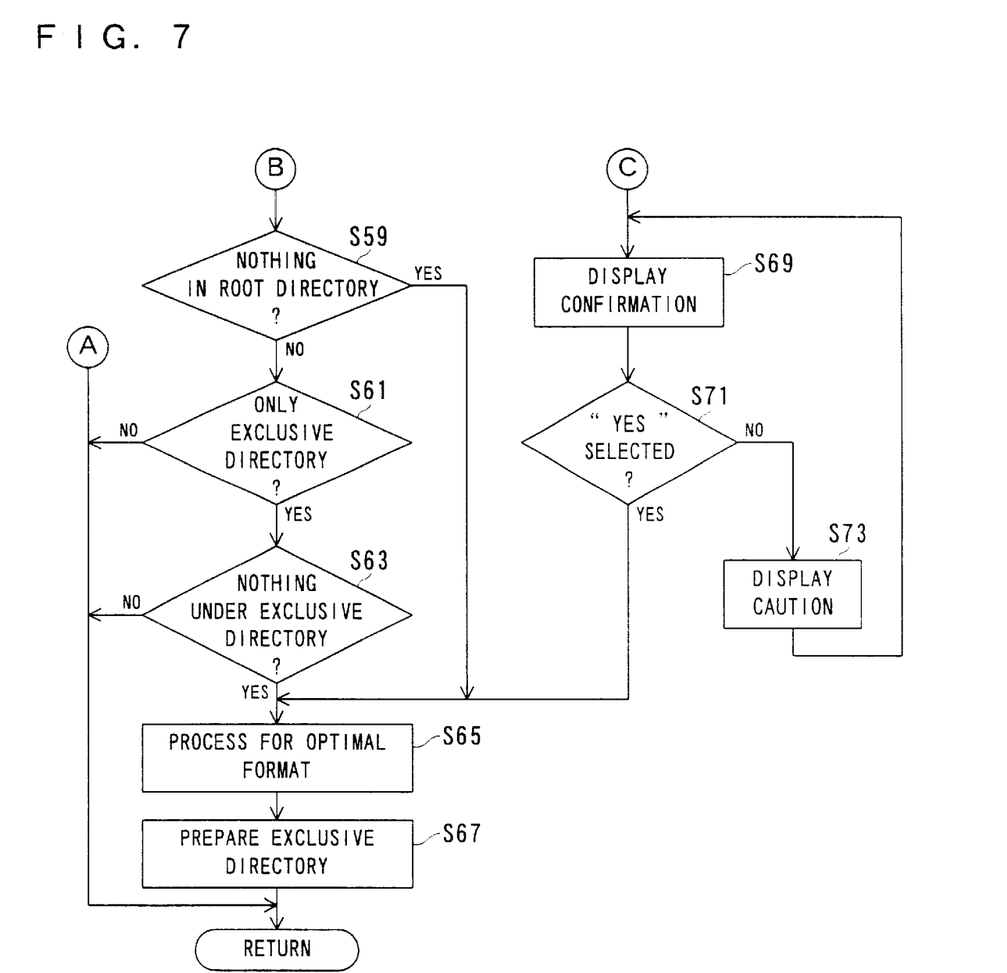
FIG. 7 is a flowchart showing another part of the operation in the FIG. 1 embodiment.

The CPU 28 starts processing of a flowcharts shown in FIG. 5 through FIG. 7 when the main power is turned on. That is, at a step S1 the memory card 46 is determined as to its format according to a subroutine shown in FIGS. 6 and 7, and, if required, a current format is converted into an optimal format.

Referring to FIG. 6, it is determined at a step S31 whether a memory card 46 is accommodated in the digital camera 10 or not. The CPU 28 concretely makes the determination of the step S31 based on an output of the sensor 44 for detecting an accommodation of the memory card 46. If "NO" here, the CPU 28 indicates a caution "NO MEMORY CARD" on the LCD 34 at a step S33. As stated before, if the opening/closing lid 38 is opened, the main power is turned off, while if the opening/closing lid 38 is closed, the main power is turned on. Accordingly, when the memory card 46 is accommodated and the opening/closing lid 38 is closed, that is, when the memory card 46 is completed of attachment, the CPU 28 resumes a process from the step S1 of FIG. 5.

If "YES" is determined at the step S31, the CPU 28 searches, at a step S35, an 8-th sector formed in the memory card 46 and then determines, at a step S37, whether this sector is a vacant area or not. If the 8-th sector is not a vacant area, it is determined at a step S53 whether this 8-th sector is a boot area or not. Specifically, the CPU 28 makes reference to the first 3 bites and the last 2 bites of the 8-th sector, and determines whether this sector is a boot area or not. As shown by underlines in FIG. 3 and FIG. 4, the first 3 bites of a boot area are "E9", "00" and "00" and the last 2 bites are "55" and "AA" in either of a normal format or an optimal format. Accordingly, a determination is made at a step S53 whether the sector is a boot area, by detecting 5 bites as above.

If the determination at the step S53 is "YES", the current format is determined as a normal format at a step S55. However, if the determination at the step S53 is "NO", it is determined at a step S57 that the memory card 46 is in an unformatted state.

Meanwhile, if "YES" is determined at the step S37, the CPU searches at a step S39 a 27-th sector, and determines at a step S41 whether this sector is a boot area or not in a similar procedure to that stated before. If "YES" at the step S41, searching is made at a step S43 for an address "00D", i.e. an address shown by a circle in FIG. 4, and it is determined at a step S45 whether the address has bites "10" or not. The address "00D" is written with data of the number of sectors contained in one cluster, which data is expressed by hexadecimal notation. Due to this, "10" means decimal number "16". If "YES" at the step S45, the number of sectors contained in the cluster is "16" and the CPU 28 determines the current format as an optimal format. Incidentally, if "NO" at the step S41 or S45, the CPU 28 determines that the memory card 46 is in an unformatted state.

Summarizing the above operations, when the memory card 46 is attached to the digital camera 10, the format determining process is commenced. If the 8-th sector is a boot area, the current format is determined as a normal format. If the 27-th sector is a boot area and further the address "00D" has data "10", the current format is determined as an optimal format. On the other hand, if the 8-th sector is neither a vacant area or a boot area, the memory card 46 is determined unformatted. Also, when the address "00D" is written with other data than "10" even if the 27-th sector is not a boot area or a boot area, the memory card 46 is determined unformatted.

If the current format is determined as an optimal format, then the CPU 28 determines at a step S49 whether there exists a directory exclusive for the image file (exclusive directory) or not. If there is no exclusive directory, CPU 28 creates, at a step S51 an exclusive directory, then returning a process. Contrary to this, if there is already an exclusive directory, the process returns as it is.

When the current format is determined as a normal format, the CPU 28 determines at a step S59 whether there is nothing in an underling layer of a root directory or not. If "YES" here, the process advances to a step S65. At this step 65 an optimal format is formed on the memory card 46 and an exclusive directory is created at a step S67, and the process thereafter returns. On the other hand, if "NO" at the step S59, that is, if any directory or file exists in the underlying layer of the root directory, it is then determined at a step S61 whether only an exclusive directory exists or not. If "NO", that is if an directory other than the exclusive directory exists, the process returns as it is in order to prevent the data within the memory card 46 from being erased. If "YES" at the step S61, the CPU 28 determines at a step S63 whether any image file is absent within the underlying layer of the exclusive directory or not. If any image file is present, the process returns in order to prevent the same image file from being erased. However, if no image file exists, the process advances to the step S65.

In this manner, even if the current format is determined as a normal format, if the memory card 46 is formed with an exclusive directory or the memory card 46 is formed with an exclusive directory and further the exclusive directory holding an image file, the memory card 46 is in a predetermined state wherein an optimal formatting is impossible. Accordingly, the optimal formatting process is disabled.

If the memory card 46 is determined unformatted, the CPU 28 causes to display "FORMAT MEMORY CARD? YES NO". If the operator opts "YES", the CPU 28 determines "YES" at a step S71 and the process proceeds to the step S65. On the other hand, if the operator selects "NO", the CPU 28 causes to display, at a step S73, "PHOTOGRAPH UNAVAILABLE WITHOUT FORMATTING" for a predetermined time period, and then the process turns to the step S69.

Returning to FIG. 5, the CPU 28 determines at a step S3 whether the current mode is a reproduce mode or not. If "NO" here, the current mode is determined as a camera mode, and a camera mode process is performed at a step S13 and thereafter the process returns to the step S3. On the other hand, if the current mode is reproduced mode, it is determined at a step S5 whether an all delete button 56 is turned on or not. If "NO", the process advances to a step S15 where it is determined whether a one-sheet delete button 52 is turned on or not. If the determination at this step is "NO", the CPU 28 advances the process to a step S25 to execute other processes, and thereafter the process returned to the step S3.

If the all delete button 56 is depressed the CPU at a step S7 causes to display "DELETE ALL IMAGE FILES? YES NO". If the operator selects "YES", the CPU determines "YES" at a step S9, and effects all deletion at a step S11, and the process returns to the step S1. Due to this, the above format determination is carried out even when all deletion is effected. Incidentally, if "NO" at the step S9, the CPU 28 advances the process to the step S15.

If the one-sheet delete button 52 is depressed, the CPU at a step S17 causes to display "DELETE IMAGE FILE? YES NO" on the LCD 34. It is determined at a step S19 whether the operator selected "YES" or not. If "NO" is selected, the process is advanced to a step S25, while if "YES" is selected, deletion of a desired image file is effected at a step S21. The CPU 28 thereafter determines at a step S23 whether there are image files remained in the memory card 46 or not. If no image file is remained the process returns to the S1, while if any image file is remained, the process is advanced to a step S25. Accordingly, even where image files are all disappeared by operating the onesheet delete button 16, the CPU carries out the above format determination.

Because the CPU 28 makes processes as the above, if the operator inserts a new memory card 46 into the camera 10 and closes the opening/closing lid 38, the normal format on the memory card 46 is changed to an optimal format. Due to this, the operator can comfortably operate the camera 10 without paying attention to the format on the memory card 46. That is, the optimal format has the number of sectors "16" included in one cluster, which is greater in sector number as compared to that of the normal format. In other words, the number of clusters included in one image file is less than that of the normal format. This reduces time to detect clusters, which in turn reduces time to reproduce and delete or write image files correspondingly. The operator can comfortably operate the camera 10.

Also, if any data has ready written on the attached memory card 46, the CPU 28 suspends formation of optimal format thus preventing the data from being intentionally deleted.

Although in this embodiment explanation was made using the smart medium (SSFDC) as the memory card 46, the present invention is also applicable to the case where using a memory medium such as a small memory card of a compact flush, miniature card or small PC card, a floppy disc, a zip, an MO (Magneto Optical disc).

The present invention is applicable to a video movie provided with a function to take still pictures besides so-called a digital still camera for still pictures.

Furthermore, in this embodiment, the format initially formed on the smart medium was explained as normal format. However, the normal format is considered to include formats obtained by initialization by a personal computer's DOS file system.

Further, in this embodiment optimal formatting is made by operator's instructions when the memory card is in an formatted state. However, optimal formatting may be forcibly made when an unformatted state is determined.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital camera for storing an image file into a detachable memory medium, comprising:
   a first determiner which determines a format of said memory medium;
   a second determiner which determines a file storing state of said memory medium; and
   a format former which forcedly forms a particular format on said memory medium when a predetermined format is formed on said memory medium and said file storing state is a predetermined state,
   wherein said particular format is an optimal format suitable for storing said image file, and
   wherein said predetermined format is a format in which a unit area assuring a sequence of data is formed by a first number of sectors, said particular format is a format in which the unit area is formed by a second number of sectors, and said second number is greater than said first number.

2. A digital camera according to claim 1, wherein said predetermined state is a state in which no directory is created in said memory medium.

3. A digital camera according to claim 1, wherein said predetermined state is a state in which, although a particular directory for storing the image file is created in said memory medium, no image file is stored in said particular directory.

4. A digital camera according to claim 1, wherein said first determiner determines a current format as said predetermined format when said memory medium has a first predetermined sector under a first predetermined area.

5. A digital camera according to claim 1, wherein said first determiner determines a current format as said particular format when said memory medium has a second predetermined sector under a second predetermined area and said second predetermined area has predetermined data existing therein.

6. A digital camera for storing an image file into a detachable memory medium, comprising:
   a first determiner which determines a format of said memory medium;
   a second determiner which determines a file storing state of said memory medium; and
   a format former which forcedly forms a particular format on said memory medium when a predetermined format is formed on said memory medium and said file storing state is a predetermined state, wherein said particular format is an optimal format suitable for storing said image file,
   wherein said first determiner determines a current format as said predetermined format when said memory medium has a first predetermined sector under a first predetermined area, and
   wherein said first predetermined sector is an 8-th sector and said first predetermined area is a boot area.

7. A digital camera according to claim 1, further comprising an instructor which instructs to delete said image file stored in said memory medium, a deleter which deletes said image file depending upon an output of said instructor, and a second enabler which enables said first determiner and said second determiner when all of said image file is deleted.

8. A digital camera according to claim 7, wherein said instructor includes an entire deletion instructor which instructs deletion of all of said image file.

9. A digital camera according to claim 1, further comprising a first enabler that enables said first determiner and said second determiner when said memory medium is attached.

10. A digital camera for storing an image file into a detachable memory medium, comprising:
    a first determiner which determines a format of said memory medium;
    a second determiner which determines a file storing state of said memory medium; and
    a format former which forcedly forms a particular format on said memory medium when a predetermined format is formed on said memory medium and said file storing state is a predetermined state, wherein said particular format is an optimal format suitable for storing said image file,
    wherein said first determiner determines a current format as said particular format when said memory medium has a second predetermined sector under a second predetermined area and said second predetermined area has predetermined data existing therein, and
    wherein said second predetermined sector is a 27-th sector and said second predetermined area is a boot area, said predetermined data is data representative of a predetermined number of sectors included in one cluster.

* * * * *